April 30, 1968 A. F. BAUER 3,380,548
SAFETY INSTRUMENT PANEL FOR AUTOMOTIVE VEHICLES
Filed June 1, 1966
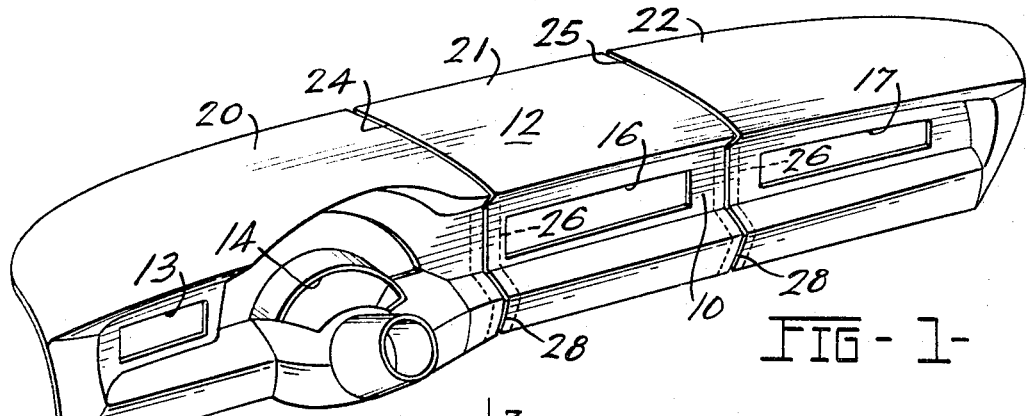
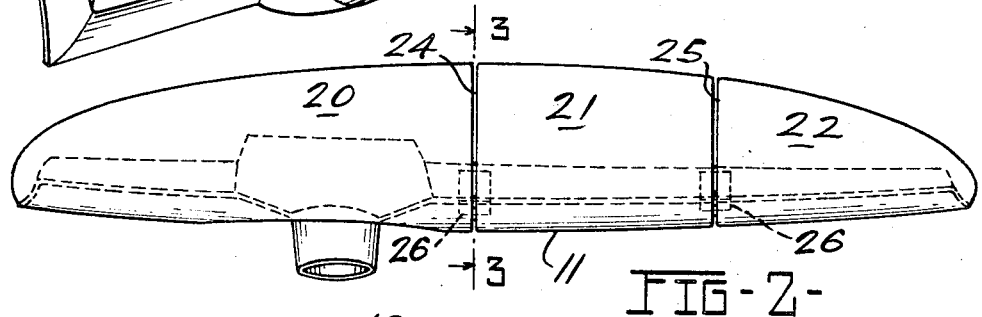
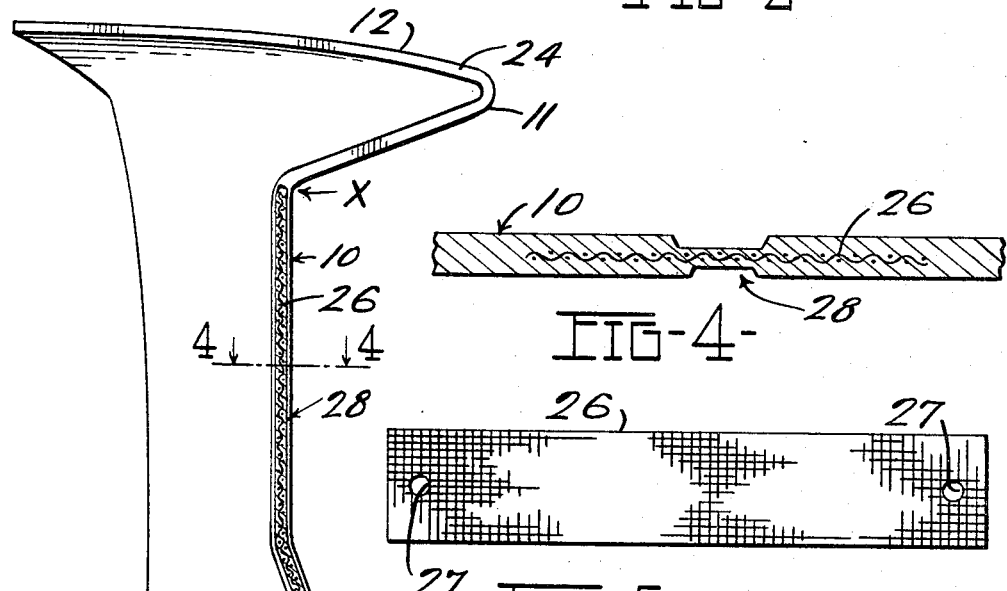
INVENTOR:
ALFRED F. BAUER.
BY
ATT'YS.

United States Patent Office 3,380,548
Patented Apr. 30, 1968

3,380,548
SAFETY INSTRUMENT PANEL FOR
AUTOMOTIVE VEHICLES
Alfred F. Bauer, Toledo, Ohio, assignor to National Lead
Company, New York, N.Y., a corporation of New
Jersey
Filed June 1, 1966, Ser. No. 554,535
3 Claims. (Cl. 180—90)

This invention relates to a safety instrument panel for automotive vehicles.

At the present time automotive instrument panels are made of sheet metal or, more recently, of die castings. It has long been recognized that irregularities and protrusions from the plane of the instrument panel are safety hazards and are capable of causing injuries to a passenger thrown against them in the event of an accident.

While the die casting technique has been adopted largely because of the ease with which complex shapes can be made, the present invention adds to the desirability of die cast members by making them safer.

The present invention solves the safety problem by subdividing the instrument panel into a multiplicity of connected sections of die cast metal with a highly ductile or flexible bridge member between each section and its neighbor in certain areas. The metal of the bridge section is covered with a very thin layer of the die cast metal so that viewed from the passenger's side the panel gives substantially the same appearance as the present, continuous die cast panel. When an instrument panel constructed in accordance with the present invention is subjected to impact by a passenger thrown against it the die cast sections yield in a controlled pattern in the area of the bridges and the flexure is taken in the ductile metal of the bridge members. The instrument panel will give or bend three or four inches in the direction of the applied impact and the controlled deceleration thus given to the passenger represents a safety factor that is highly desirable.

The present invention further provides subdividing the instrument panel by slotting it continuously in the sections lying in a plane parallel to the direction of impact. These sections are usually substantially flat and are covered with so-called padding or upholstery so that the slotted portions of the panel are never apparent in the finished vehicle.

The primary object of the present invention is to provide a die cast instrument panel having the property of collapsing to a controlled extent under impact, yet retaining the appearance and dimensional stability of present units.

Other objects and advantages of the invention will become apparent from the following description of a preferred embodiment thereof, reference being had to the accompanying drawings, in which:

FIG. 1 is a perspective view of an instrument panel constructed in accordance with the present invention;

FIG. 2 is a top plan view thereof;

FIG. 3 is a section on line 3—3 of FIG. 2;

FIG. 4 is a fragmentary section on line 4—4 of FIG. 3; and

FIG. 5 is an elevational view of a bridge element forming a part of the instrument panel.

The drawings show an instrument panel having a typical configuration for a modern car including a vertical front portion 10, a rounded protrusion 11 and a forwardly extending shelf-like area 12. The vertical front portion 10 is sometimes curved laterally from side to side of the vehicle, depending on the design of the car. Conventional openings are formed in the front portion 10 to receive instruments as at 13 and 14. Usually a center opening 16 is provided to receive a radio, and a side opening 17 is provided for a glove box which is closed by a hinged door that is not part of the instrument panel casting. A padding or upholstery layer covers the panel from the front of the shelf-like area 12 to a point generally in the region X under the protrusion 11.

At the present time the entire unit so far described is made of a single die casting. According to the instant invention, however, the instrument panel casting is subdivided into two or more connected elements. The drawings show subdivision into three elements 20, 21 and 22 which leaves slots 24 and 25 in the shelf-like area 12 and in the protrusion 11. These slots, however, are covered by the padding or upholstery layer that is later applied.

FIGURES 3 and 4 show in detail the manner of connecting the casting elements 20, 21 and 22. A ductile bridge member 26 having a length substantially equal to the height of the vertical front panel portion 10 is inserted itno the die prior to casting. The bridge member 26 is preferably an initially flat piece of perforated or woven metal of a highly ductile nature and thinner than the casting. For example, if the casting is ultimately 0.070″ thick, the bridge member 26 may be only 0.020″ thick and may be formed of soft metal screening or other flexible material such as a fiber glass fabric. The bridge member may be piloted in the die by openings 27 which are received over pin parts of the die assembly when the die is open. These pin parts may comprise ejector pins or specially placed dowels. As the die is closed the bridge member will be easily bent to take the configuration of the adjacent die parts which, as above noted, may be slightly curved either vertically or horizontally depending on the design of the instrument panel being cast.

In the area adjacent the center of the bridge member 26 the die parts approach each other very closely in the closed position so that the casting is thin or weakened along a line 28 extending the length of the bridge member, yet the bridge member is fully covered with casting metal and is not visible when the casting is removed from the die. It is preferred that the step in the casting be made primarily in the rear surface so that the discontinuity thus resulting is hardly visible from the front and that the flex line 28 formed in the casting be only about ⅛″ wide.

It will be seen from the section of the casting shown in FIG. 4 that the bridge member 26 spans the weakened area of the casting for an appreciable distance, such as 1″ on each side of the flex line 28 to provide an efficient anchorage and to impart rigidity to the casting in a direction normal to the direction of intended flexure or in the direction of impact. In these areas, the die cast metal will enter the interstices of the bridge member to anchor the same in a known manner.

By varying the thickness of the casting in the region of the flex line 28, and by varying the strength and ductility of the bridge members 26 any desired degree of impact strength can be imparted to the completed casting.

When the instrument panel cast as described with the bridge members 26 interposed between sections 20, 21 and 22 is subjected to impact by a passenger thrown forward in an accident, the center section 21 will give way very substantially along the two flex lines 28. The slots 24 and 25 will open to permit whatever movement is required between sections. The passenger will thus be protected against injury from striking a stiff, unyielding instrument panel as now frequently happens.

While the invention has been disclosed in conjunction with a specific form and disposition of the parts of an instrument panel, it should be readily appreciated that it is applicable to other vehicle parts where a predetermined yield under impact can be used to make a safer vehicle.

What I claim is:

1. A die cast part for an automotive vehicle subject to impact in one direction comprising a plurality of die cast sections, said die cast sections being connected at least in a plane normal to the direction of impact by weakened areas, and bridge elements comprising highly ductile metallic members spanning said weakened areas and embedded in said die cast sections on each side thereof during casting.

2. An instrument panel for an automotive vehicle subject to impact in one direction, said panel comprising a plurality of die cast sections, said die cast sections being connected at least in a plane normal to the direction of impact by weakened areas, and bridge elements comprising highly ductile metallic members spanning said weakened areas and embedded in said die cast sections on each side thereof during casting.

3. An instrument panel in accordance with claim 2 in which said die cast sections are separated from each other in planes parallel to the direction of impact.

References Cited

UNITED STATES PATENTS

| | | | |
|---|---|---|---|
| 1,353,427 | 9/1920 | Seguin | 180—90 |
| 2,571,627 | 10/1951 | Sloman et al. | 180—90 |
| 2,870,871 | 1/1959 | Stevinson. | |
| 3,030,255 | 4/1962 | Winston. | |
| 3,042,137 | 7/1962 | Mathues et al. | 180—90 |
| 3,285,091 | 11/1966 | Fiala | 280—150 X |
| 3,341,248 | 9/1967 | Baryenyi et al. | 180—90 X |

KENNETH H. BETTS, *Primary Examiner.*